United States Patent [19]

Park

[11] Patent Number: 4,624,541
[45] Date of Patent: Nov. 25, 1986

[54] MULTIPLE FUNCTION CAMERA

[76] Inventor: Sea C. Park, 3836 Birchwood, Skokie, Ill. 60076

[21] Appl. No.: 664,973

[22] Filed: Oct. 26, 1984

[30] Foreign Application Priority Data

Jun. 23, 1984 [KR]  Rep. of Korea ............... 3598/1984

[51] Int. Cl.[4] .................. G03B 13/02; G03B 17/50; G03B 19/12
[52] U.S. Cl. ............................ 354/83; 354/156; 354/212; 354/219; 354/295
[58] Field of Search ............... 354/83, 84, 85, 86, 354/152, 155, 156, 171, 173.1, 174, 210, 212, 214, 216, 219, 222, 224, 225, 200

[56] References Cited

U.S. PATENT DOCUMENTS

| | | | |
|---|---|---|---|
| 3,638,547 | 2/1972 | Sekida | 354/212 |
| 3,765,313 | 10/1973 | Faris et al. | 354/222 |
| 3,800,311 | 3/1974 | Olsson | 354/174 |
| 3,828,644 | 8/1974 | Uchida | 354/219 |
| 4,165,933 | 8/1979 | Sunouchi et al. | 354/219 |
| 4,199,240 | 4/1980 | Norris | 354/222 |
| 4,348,086 | 9/1982 | Forscher | 354/83 |
| 4,374,614 | 2/1983 | Kobayashi | 354/216 |
| 4,435,060 | 3/1984 | Kobayashi | 354/210 |
| 4,482,230 | 11/1984 | Magariyama et al. | 354/219 |
| 4,531,818 | 7/1985 | Bally | 354/83 |

FOREIGN PATENT DOCUMENTS 2032122  4/1980  United Kingdom ............... 354/210

Primary Examiner—A. A. Mathews
Attorney, Agent, or Firm—Birch, Stewart, Kolasch & Birch

[57] ABSTRACT

A single lens reflex camera which can be modified to also function as a mid-format, more sophisticated camera which comprises a main camera body containing a film advancing lever, a film storage shaft and a film advancing shaft which connects with the film advancing lever, the film advancing shaft containing film sprockets which are adapted to engage and advance the film through the camera through the operation of the film advancing lever, a lens system containing a reflecting mirror, a film back attachment housing adapted to be connected to the back of the main camera body, the film back attachment housing changing the film plane from that of a single lens reflex camera to that of a mid-format camera, the film back attachment housing containing a film advancing system for conveyihng 120 mm or 220 mm film across said changed film plane, a gear system providing communication between the film advancing shaft and the film advancing system of the film back attachment housing whereby the film in the film back attachment housing can be advanced across the changed film plane by the operation of the film advancing lever, and an adjustable view finder which is adjustable to accommodate the film planes of both the single lens reflex camera and the mid-format camera, so that the distance from the center of the mirror to the desired film plane is equal to the distance from the center of the mirror to the focusing screen.

12 Claims, 16 Drawing Figures

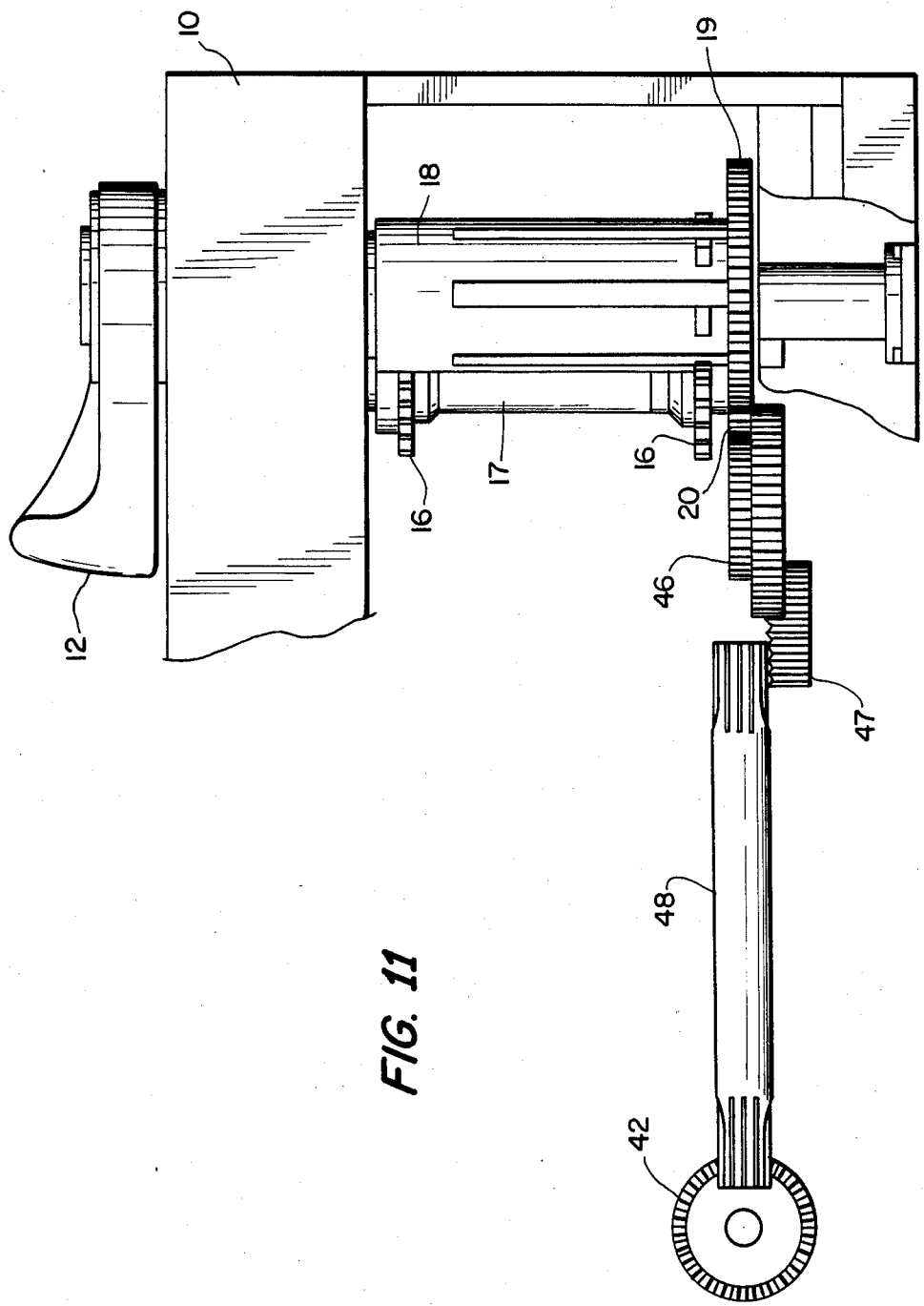

MULTIPLE FUNCTION CAMERA

BACKGROUND AND SUMMARY OF THE INVENTION

The present invention relates to a modified 35 mm single lens reflex camera (hereinafter referred to as "35 mm SLR") which functions as a middle format, more sophisticated, higher performance camera (hereinafter referred to as "mid format camera"). Through various adjustments and modifications, the 35 mm SLR can be inexpensively converted to the higher performance "mid format camera" thereby providing a camera which has the double function of utilizing the best features of both cameras. Also the 35 mm SLR can be further modified to function as a "Polaroid" or self developing camera. It should be understood that "Polaroid" is a registered trademark of the Polaroid Company.

Presently known cameras can be classified into three basic types, that is, a 35 mm small size camera, a mid format medium size camera, and a large format large size camera. These cameras have their various advantages and disadvantages in accordance with their sizes. Generally speaking 35 mm cameras have the advantages of handling ease, responsiveness, inexpensive price and compact construction. However, because of their small size and small size negatives, the quality of the photograph, including color, sharpness of image, the number of operational controls and the like is not as good as the mid format cameras. On the other hand a middle size or mid format camera can produce a photograph of high quality color and image sharpness while providing a camera with many options, thereby giving the operator the flexibility of taking a variety of pictures under a variety of conditions. However, mid format cameras are very expensive and large in size and thus are very inconvenient to carry.

A demand has developed for a camera which combines the best features of both the small and mid format camera while eliminating the disadvantageous features of these cameras that is, a camera which is small and compact, easy to operate and carry while at the same time is capable of producing magnificently sharp, true-color images and create photographs which were heretofore only possible with the mid or large format cameras.

Accordingly, an object of the present invention is to provide a modified 35 mm SLR camera which has the function of selectively performing as a 35 mm SLR camera, a mid format camera or a Polaroid or self-developing camera.

Another object of the present invention is to provide a modified 35 mm SLR camera which is inexpensive, small and compact in size and easy to handle while at the same time is capable of taking pictures with magnificently sharp, true-color images comparable to those which can be taken with larger cameras.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention is directed to a 35 mm SLR camera equipped with an improved optical system, an adjustable view finder, a film back attachment with an associated gear system, and a Polaroid or self-developing type film back attachment which make it possible to convert a 35 mm SLR camera which possess the advantages of a small size camera to a Polaroid or self-developing camera or a mid format, middle size camera with the attendant advantages discussed hereinabove.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11 shows in detail the camera gear system which converts the small size 35 mm SLR camera to a medium size camera which utilizes 120 mm and 220 mm film;

DETAILED DESCRIPTION OF THE DRAWINGS

Figure 1:
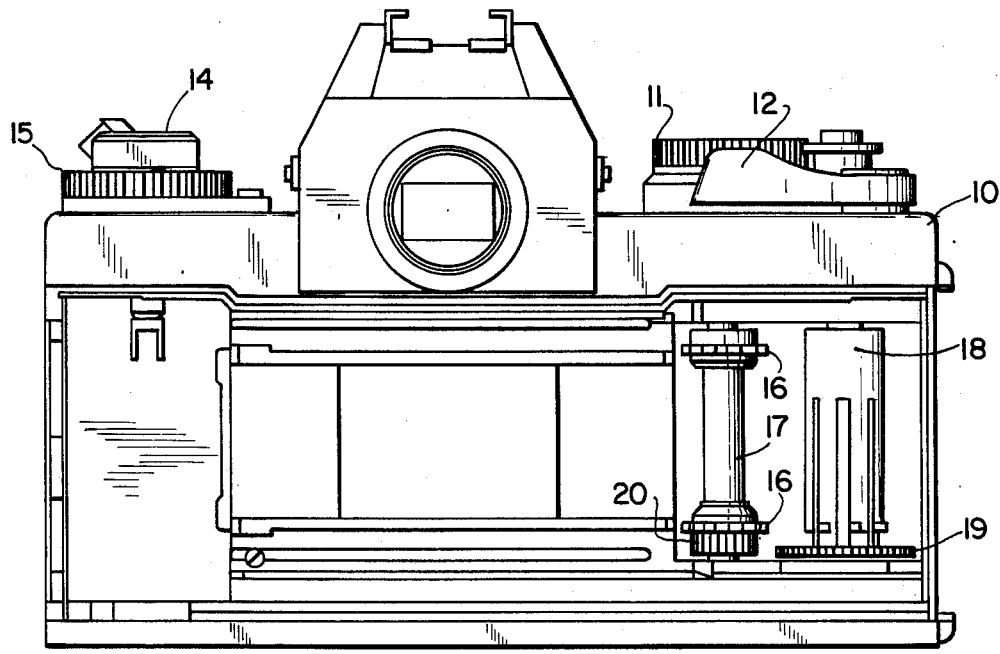
FIGS. 1 and 2 are a back view and a side view of a 35 mm camera utilized in connection with the present invention.
Figure 2:
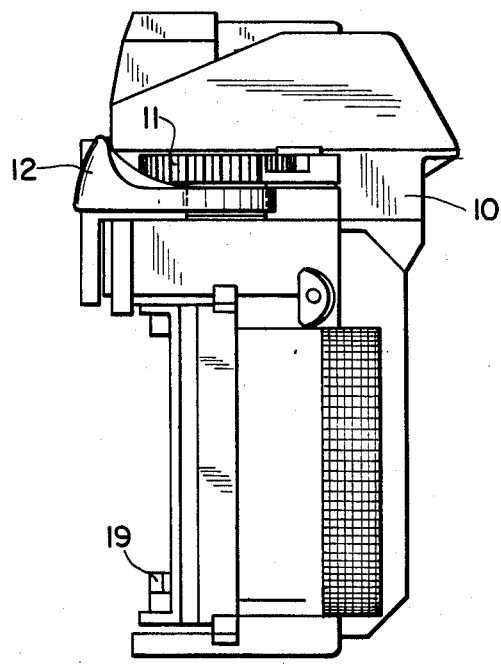
Figure 3:
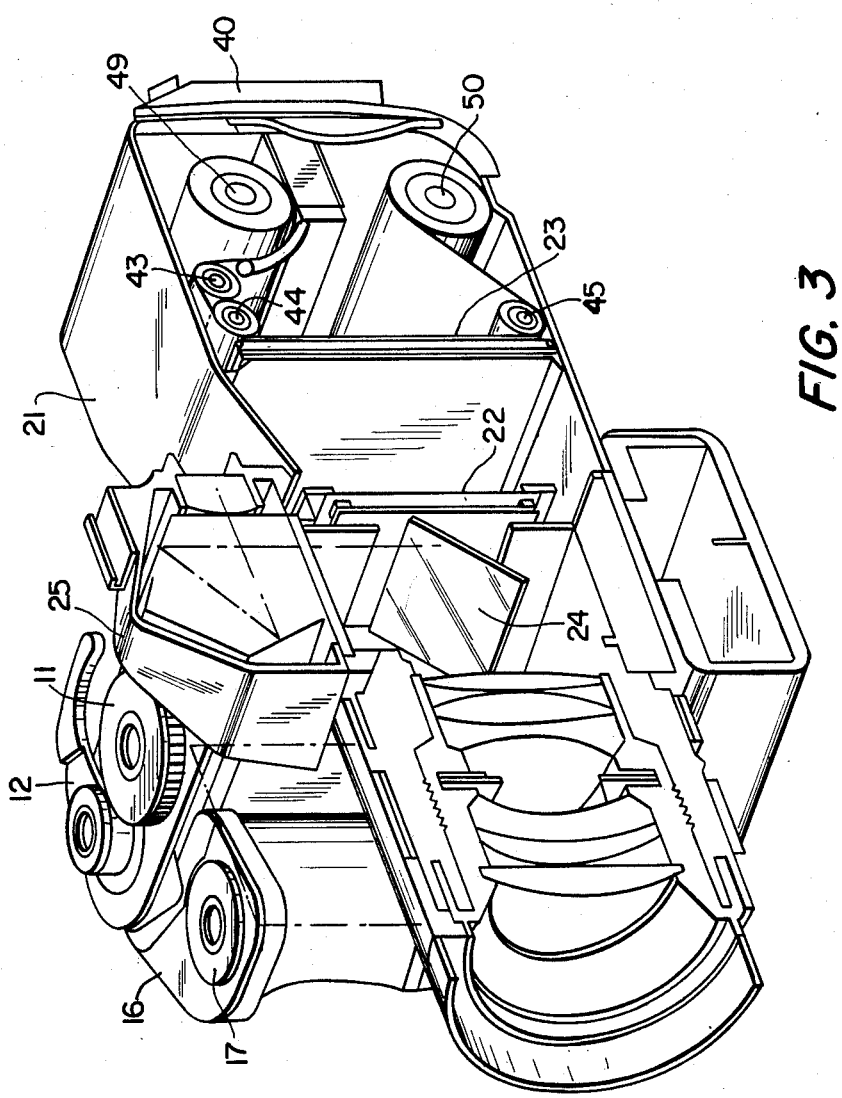
FIG. 3 is a sectional perspective view of the 35 mm SLR camera modified in accordance with the present invention, taken along line A-A' of FIG. 6.
Figure 4B:
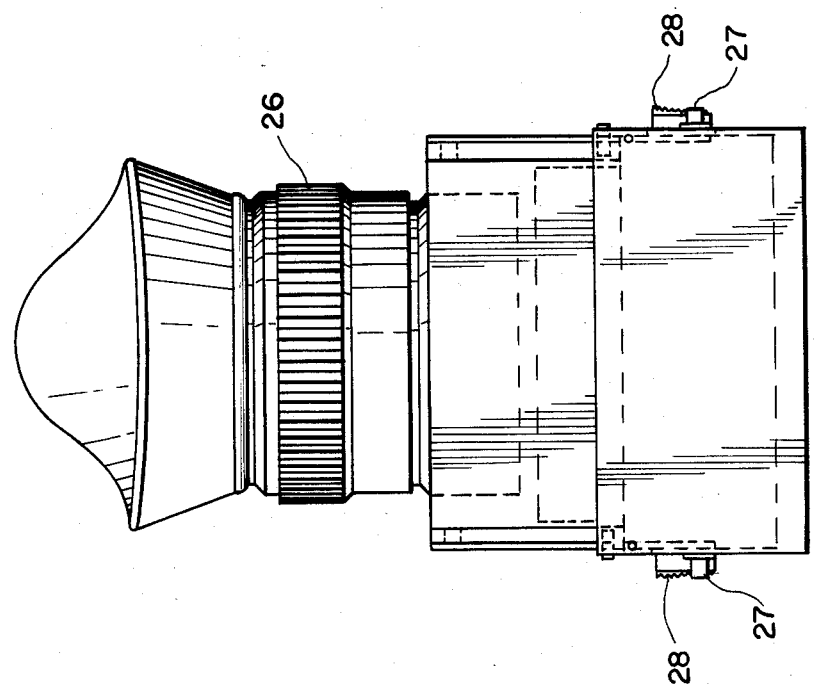
FIGS. 4A and 4B illustrate in a side view and rear view of how the view finder can be adjusted to compensate for the two different focal lengths which are utilized in the present invention.
Figure 4A:
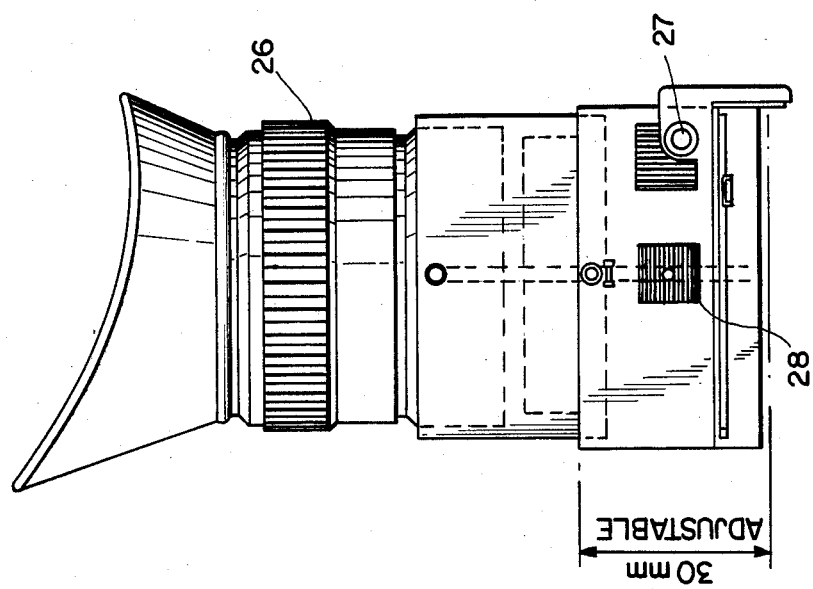
Figure 5A:
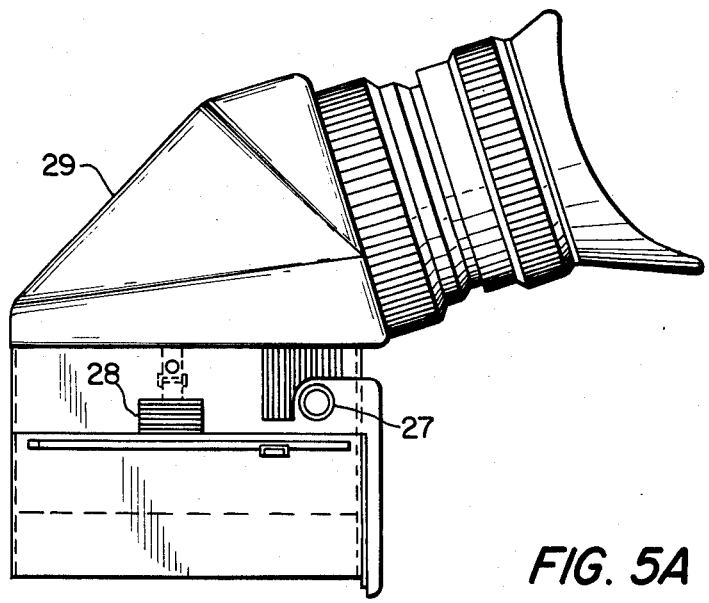
FIGS. 5A and 5B show another embodiment of an adjustable view finder utilized in accordance with the present invention.
Figure 5B:
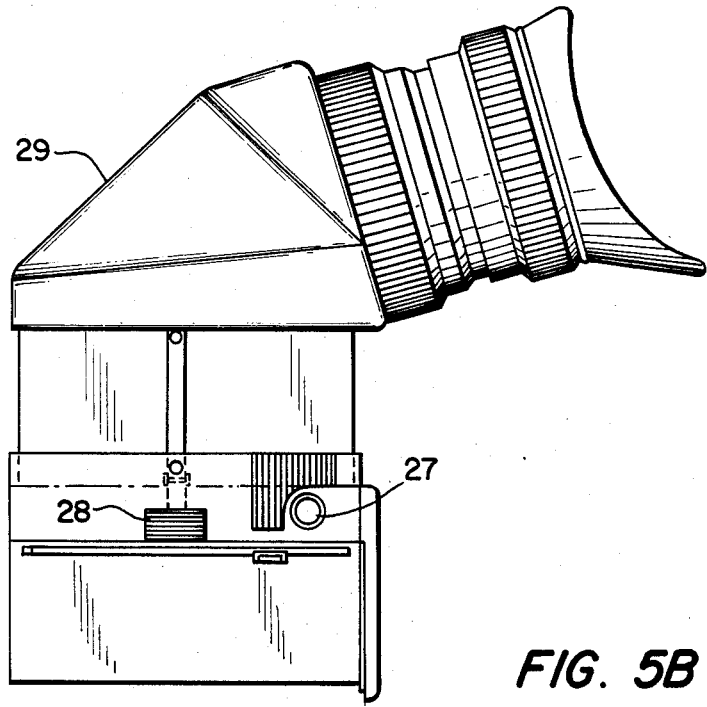

Reference is now made to the drawings for the purpose of illustrating the present invention. FIGS. 1 and 2 show a standard 35 mm SLR camera which is of the type which can be modified in accordance with the present invention. The camera as shown in FIGS. 1 and 2 has all of the standard features of a 35 mm SLR camera, including a main camera body 10, a shutter speed selector 11, a film advance lever 12, a dial 13 (FIG. 6) showing the various shutter speeds which can be chosen by the shutter speed selector 11, an ASA film speed indicator 15 and a lever 14 for manually winding used film back onto the film reel for removal from the camera. Elements 16 represent film sprockets which are disposed on a film advancing shaft 17. The film sprockets 16 are adapted to engage in holes provided along the edges of the film and thus facilitate in advancing the film together with the operation of the film advance lever 12. As pictures are taken, the exposed film is collected on the film storage shaft 18 which is provided with a film rotary gear 19. FIG. 2 merely represents a side view of the camera shown in FIG. 1. FIGS. 3 and 4 show how the camera of FIG. 1 can be modified to convert the 35 mm SLR camera of FIG. 1 to a mid format camera. Basically, two major modifications must be made, that is, the film plane must be modified in order to accommodate the 120 mm or 220 mm size films, and in addition, the view finder must be adjusted to accommodate the relocation of the film plane. FIG. 3 shows a housing 21 which, in accordance with the present invention, is attached to the 35 mm camera similar to that shown in FIG. 1 to change the location of the film plane from position 22 which is utilized by 35 mm cameras to position 23 which is the film plane required for 120 mm or 220 mm film. Since the distance from the center of the mirror to the film surface or film plane 23 must be equal to the distance from the center of the mirror to the focusing screen, the focusing screen must be adjustable to correspond to the new focal length created by the changing of the film plane to position 23. Accordingly, the head piece 25, which is normally removable on modern day cameras is replaced with a focusing screen (view finder) such as shown in FIGS. 4A, 4B, 5A and 5B. In FIG. 4A, for example, the view finder 26 can be attached to the camera in place of the head piece 25. The view finder is provided with a release knob 27 to facilitate easy attachment and removal of the view finder from the camera. Thus, a variety of different types of view finders can be effectively attached to the camera such as, for example, the type of view finder as shown in FIGS. 5A and 5B. In order to adjust the view finder so as to correspond to the position of the film plane 23 for utilizing 120 mm and 220 mm film, push button 28 is depressed so that the view finder can be slidably extended so that 120 mm and 220 mm film can be effectively utilized. As shown in FIG. 4A, a slidably extension of 1.25 inches in the view finder corresponds to an extension of the focal length 30 mm, that is, from a focal length of about 40 mm which corresponds to the 35 mm film plane to a focal length of about 70 mm which corresponds to a 120 mm or 220 mm film plane. FIG. 4B merely represents a rear view of the view finder of FIG. 4A. FIG. 5A shows a modified form of a view finder identified as element 29 wherein the eye piece is disposed at an angle as compared to that of FIG. 4A. FIG. 4B merely shows the view finder of FIG. 4A in its extended position for use when taking pictures with 120 mm or 220 mm film.

Figure 6:
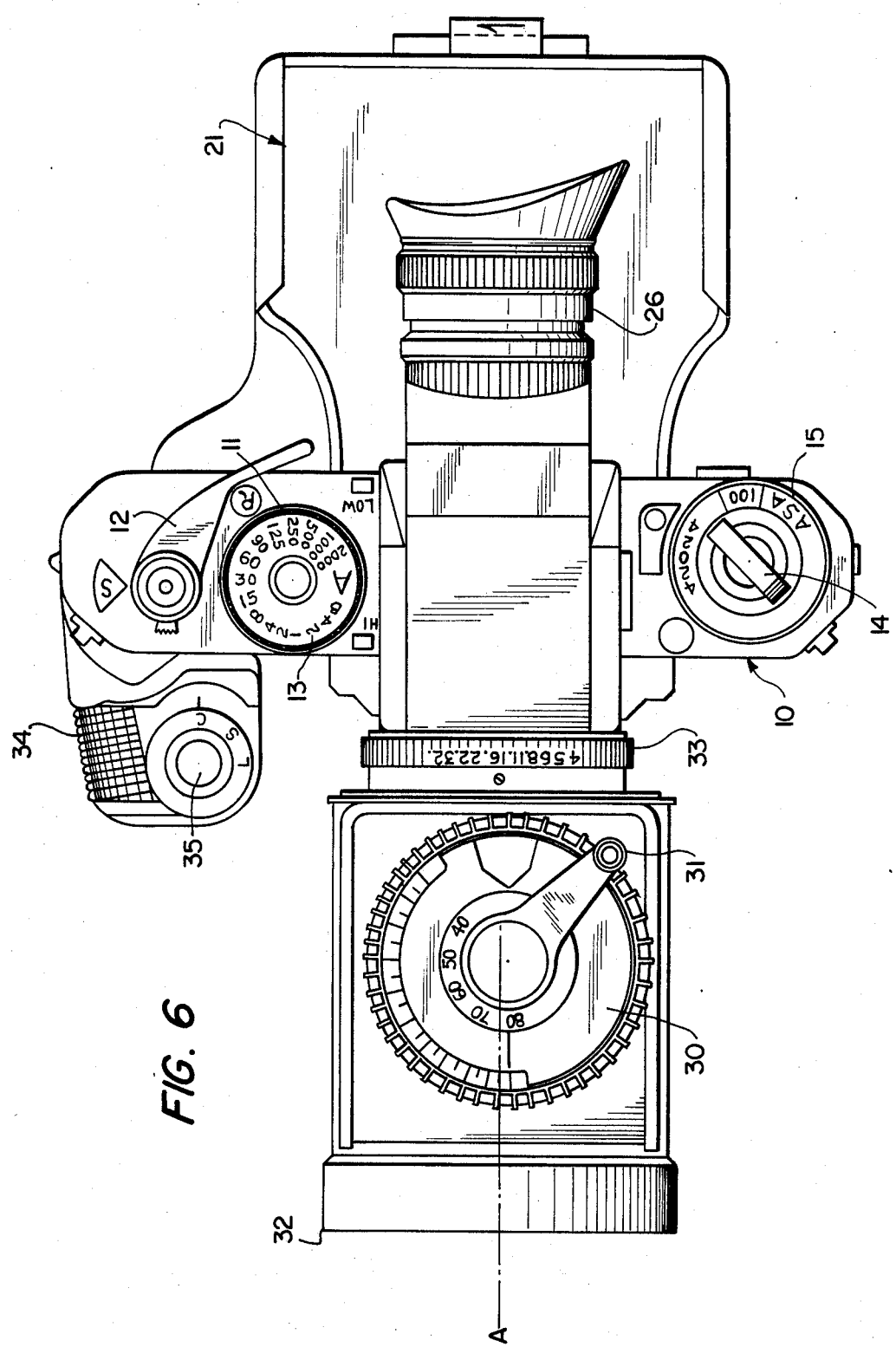
FIG. 6 is a top view of the 35 mm SLR camera modified in the manner of the present invention.

FIG. 6 shows a top view of a 35 mm camera which has been modified in accordance with the present invention by the addition thereto of a view finder 26 such as that shown in FIG. 5A and a housing 21 for changing the film plane such as that shown in FIG. 3. FIG. 6 also shows an optical system having a lens focusing dial 30, which although shown on the top of the camera can also be disposed around the lens, a lens shifting knob 31 for changing the focal length, a lens 32 and lens aperture ring 33. The camera shown in FIG. 6 also contains an automatic film winding attachment 34 which is provided with a motor driven shutter 35. The automatic film winding device 34 drives the film at a speed of six frames per second, which is at a higher speed than that of the mid format cameras and can be operated as a single frame. The motor drive shutter 35 which is operatively connected to the automatic film winding device 34 is located at the far left of the camera so that the index finger of the photographer can reach it without bending the finger.

Figures 7, 12:
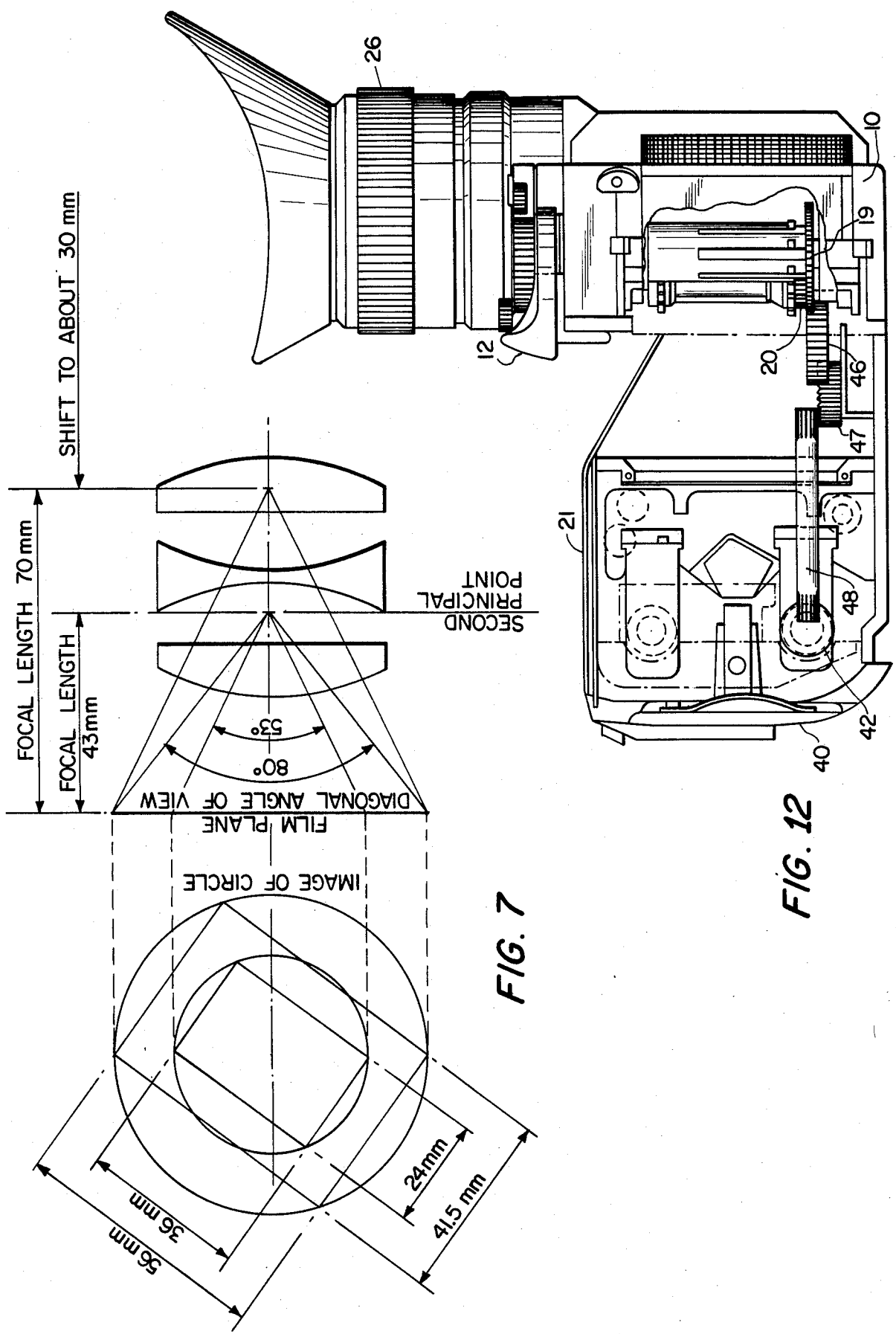
FIG. 7 shows the size of the lens and the relationship between the film planes and focal lengths utilized in the present invention.
FIG. 12 shows in more detail how the film back attachment housing is operatively attached to a 35 mm camera in accordance with the present invention.

As shown in FIG. 3, the film plane 22 utilized by a standard 35 mm camera is disposed at a focal length of about 43 mm from the lens system and the film plane 23 which is used in conjunction with 120 mm and 220 mm film is disposed at a focal length of about 70 mm from the lens system. The location of these film planes were determined in accordance with the following mathematical calculation, based on where the focal point of the small circle of the the 35 mm SLR camera meets with the large circle of a mid format camera. As shown in FIG. 7, in the small circle of the 35 mm SLR camera, the length and width of the rectangle are 36 mm and 24 mm, respectively. Based on these dimensions, the following calculations can be made:

$$\tan \frac{24}{36} = 0.66666$$

$$\tan^{-1} 0.666 = 33.690$$

$$\frac{24}{\sin 33690} = \frac{36}{\sin 56.31} = \frac{x}{\sin 90}$$

$$x = \frac{36 \times \sin 90}{\sin 56.31} = \frac{36 \times 1}{0.8320} = 43.269231 \simeq 43 \text{ mm}$$

In the large circle corresponding to the mid format size camera, the length and width of the rectangle are 56 mm and 41.5 mm, respectively. Using these dimensions the following calculations can be made:

$$\tan \frac{41.5}{56.0} = 0.7410714$$

$$\tan^{-1} 0.7410714 = 36.54$$

$$\frac{41.50}{\sin 36.54} = \frac{56.00}{\sin 53.46} = \frac{x}{\sin 90}$$

$$x = \frac{56 \times \sin 90}{\sin 53.46} = \frac{56}{0.80344} = 69.700289 \simeq 70 \text{ mm}$$

With the above calculations in mind, the view finder can be adjusted according to the present invention in order to accommodate a focal length of 43 mm when the camera is operating as a 35 mm camera or 70 mm when the camera is operating as a mid format camera which utilizes 120 mm or 220 mm film. The adjustable view finder of the present invention is of the 6× focusing type or the AE finder type as shown in FIGS. 4 and 5 of the present application although other types of view finders can be effectively used and modified in accordance with the present invention.

Figure 8:
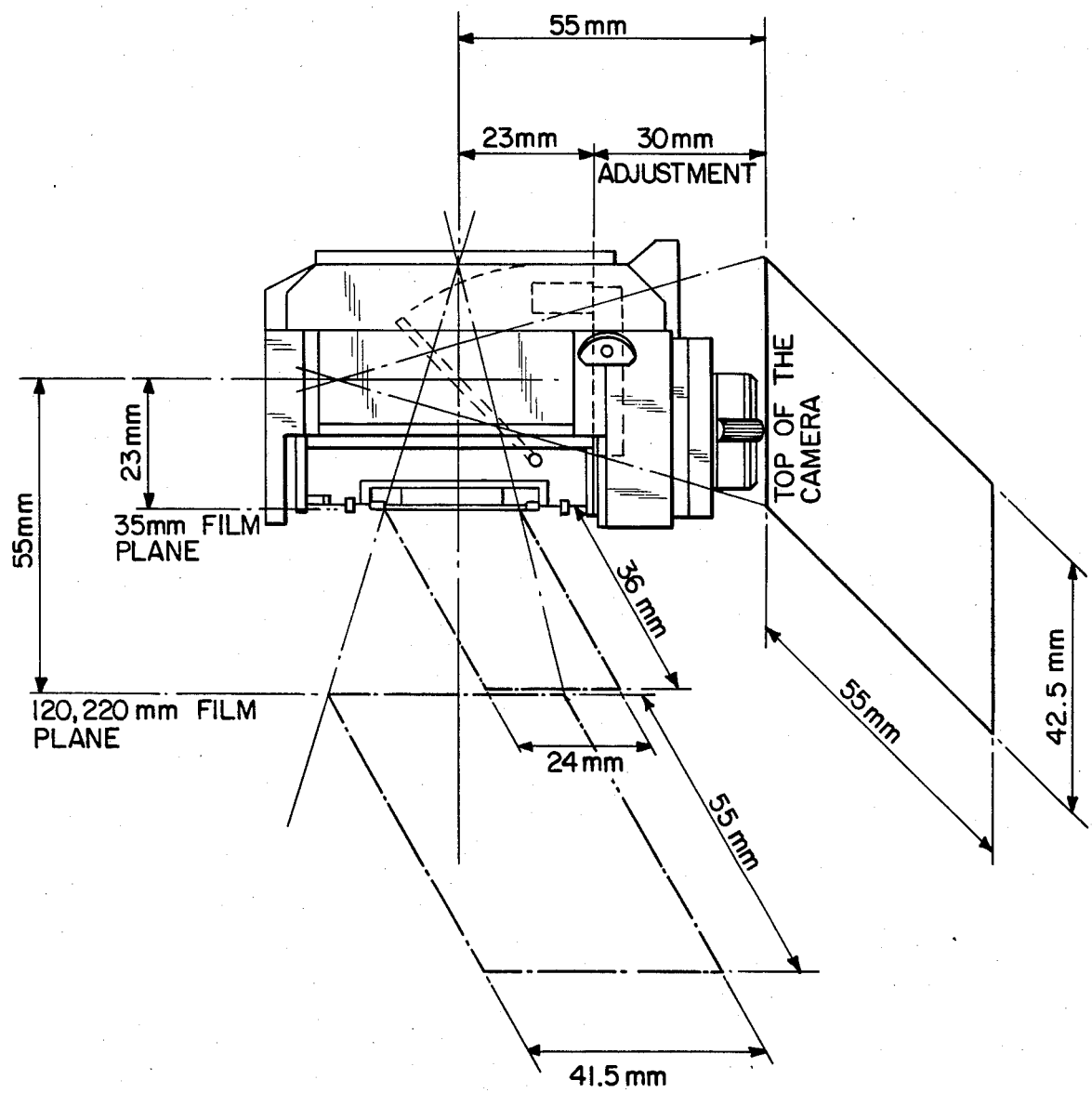
FIG. 8 diagrammatically shows the actual size of the film frames when utilizing the two different focal lengths, according to the present invention.

FIG. 8 shows the actual size of the film frame when changing from a 35 mm camera to a mid format camera. Thus, for example, a 35 mm dimension shown in FIG. 8 corresponds to the actual film frame of 35 mm film whereas the 55 mm dimension corresponds to the actual frame of the 120 mm or 220 mm film. The 30 mm adjustment shown in FIG. 8 represents the amount of adjustment in the focusing screen to convert from a 35 mm to a mid format camera utilizing 120 mm or 220 mm film. In this connection, it should always be understood that the distance of the focusing screen to the middle of the mirror must always equal the distance from the middle of the mirror to the film surface disposed on the film frame.

Figure 10:
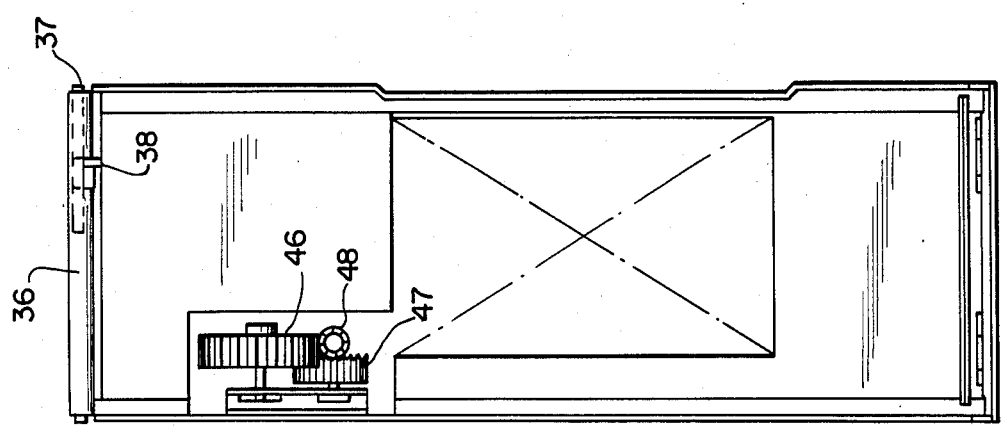
FIGS. 9 and 10 are top and end views, respectively, of the present invention containing the film back attachment.
Figure 9:
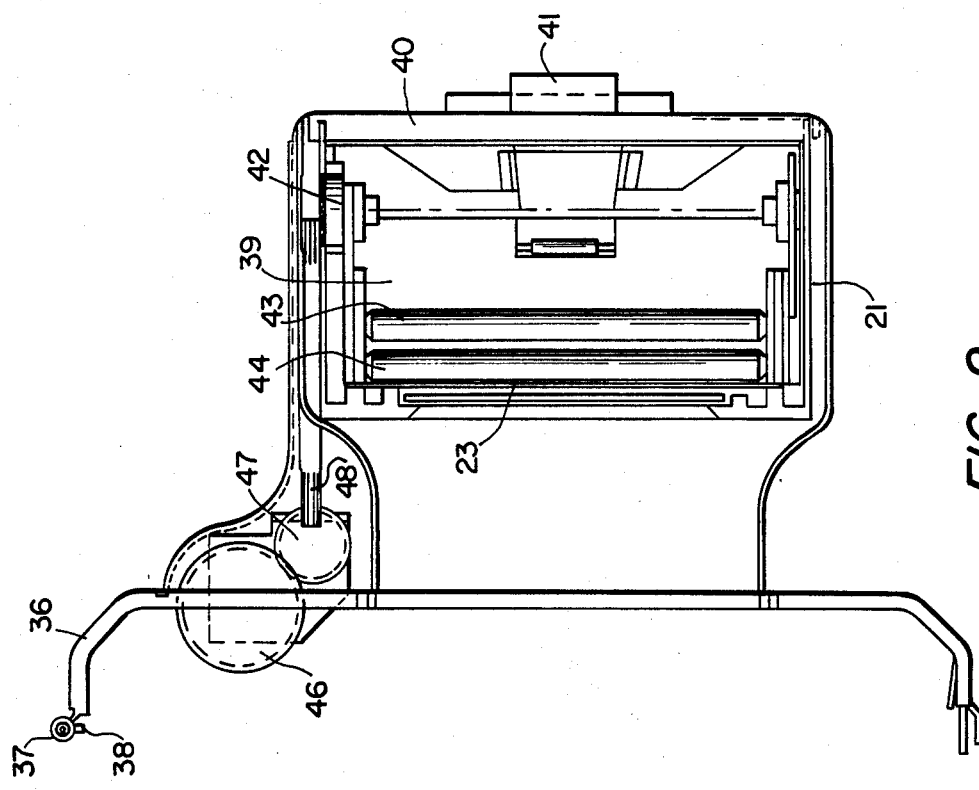

FIGS. 9 and 10 show how the film back attachment housing 21 can be attached to the back of a 35 mm SLR camera in order to change the film plane and convert the camera into a mid format type camera which utilizes 120 mm or 220 mm film. According to the present invention, the back panel or door of the 35 mm camera is removed similarly as shown in FIGS. 1 and 2 and replaced with panel member 36 utilizing the spring bias hinge pin 37 and button 38 which operates to attach and/or remove the panel member 36. The film back attachment housing 21 defines a film chamber 39 and is provided with a housing door 40 which can be opened and closed through the operation of the slide lock 41. The film chamber 39 also contains a film rotary gear 42 which functions to advance the film in the film back attachment housing from the position where fresh film is introduced into the back of the housing 21 along rollers 43 and 44 across the film plane 23, around roller 45 and onto roller 50. In order to advance the film within the film back attachment housing, the film rotary gear 42 is connected to the film advancing lever 12 through intermediate gears 46, 47 and 48 and main gear 20 disposed on the film advancing shaft 17. Thus but actuating the film advancing lever 12, the main gear 20 on the film advancing shaft 17 is rotated and this rotation is transferred through the intermediate gears and film rotary gear 42 for advancing the film through the film back attachment housing. FIG. 11 shows, in detail, how the various gears interrelate in transferring the operation of the film advance lever 12 to the film rotary gear 42 in the film back attachment housing 21.

Figure 14:
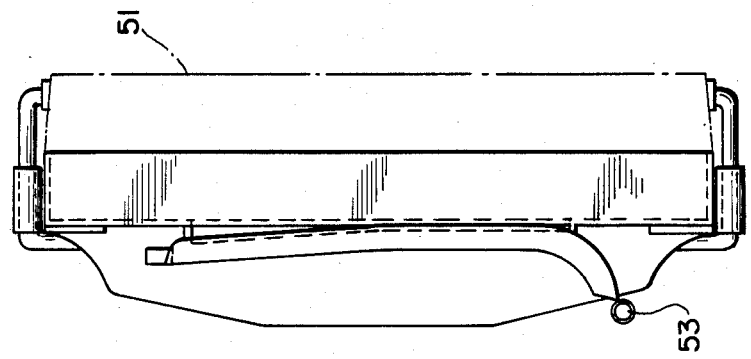
FIGS. 13 and 14 are front and side views of the polaroid film back attachment utilized in accordance with the present invention.
Figure 13:
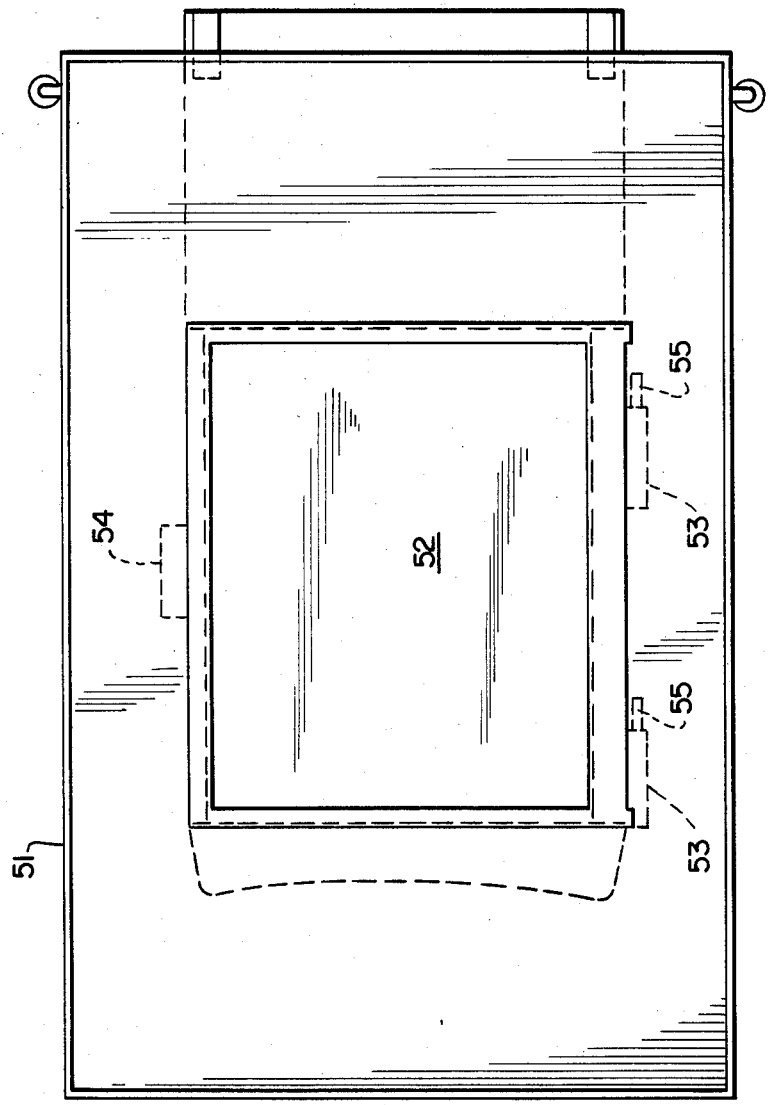

FIG. 12 shows a 35 mm camera which has been modified by the attachment of the film back housing discussed hereinabove. FIGS. 13 and 14 show how a 35 mm camera can be modified so as to permit it to function as a Polaroid or self-developing camera. Thus, according to the present invention, the back of a 35 mm camera is removed similarly as shown in FIGS. 1 and 2 and the Polaroid or self-developing type attachments shown in FIGS. 13 and 14 are attached thereto. As shown in FIG. 13, the film chamber 51 is provided with a housing door 52 which is attached to the housing by hinge pins 53 and slide lock 54. In mounting the Polaroid or self-developing type attachment to the back of the camera, the housing door can be removed by depressing the push buttons 55 to release the hinge pins 53 and thus the door 52 from the film chamber. Then the film chamber can be attached to the back of the 35 mm camera in the same manner as shown in FIG. 9 with respect to the attachment of the film back housing or in any other manner well known to one skilled in the art. Because of the attachment of the Polaroid or self-developing type film to the back of the camera, the film plane and thus the focal length has been changed and accordingly, it is necessary to either adjust the view finder to compensate for the change in the focal length or utilize a different view finder which functions within the desired focal length. It has been found that when utilizing a standard Polaroid or self-developing type package, the adjustable view finder of the present invention must be raised about 20 mm to compensate for the changes in the focal length created by the introduction of a new film plane.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:
1. A single lens reflex camera which can be modified to also function as a mid-format, more sophisticated camera which comprises
   a main camera body containing a film advancing lever, a film storage shaft and a film advancing shaft which connects with said film advancing lever, said film advancing shaft containing film sprockets which are adapted to engage and advance the film through the camer through the operation of the film advancing lever,
   a lens system containing a reflecting mirror,
   a film back attachment housing adapted to be connected to the back of the main camera body, said film back attachment housing changing the film plane from that of a single lens reflex camera to that of a mid-format camera, said film back attachment housing containing a film advancing system for conveying 120 mm or 220 mm film across said changed film plane,
   a gear system providing communication between said film advancing shaft and said film advancing system of the film back attachment housing whereby the film in the film back attachment housing can be advanced across the changed film plane by the operation of the film advancing lever, and
   an adjustable view finder having a focusing screen, said view finder being adjustable to accommodate the film planes of both the single lens reflex camera and the mid-format camera, so that the distance from the center of the mirror to the desired film plane is equal to the distance from the center of the mirror to the focusing screen.
2. The single lens reflex camera of claim 1 wherein the view finder is provided with a slidable adjustment for changing the distance between the focusing screen and the mirror.
3. The single lens reflex camera of claim 2 wherein the view finder is provided with a focal length adjustment of up to about 30 mm.
4. The single lens reflex camera of claim 1 wherein the view finder is removably attached to the camera body.
5. The single lens reflex camera of claim 1 wherein the film advancing shaft is provided with a main gear which connects with the gear system of the film back attachment.
6. The single lens reflex camera of claim 1 wherein the film advancing system of the film back attachment housing comprises means for loading fresh film therein, means for taking up exposed film therein and roller means for transferring the film from the loading means to the take up means across the film plane.
7. The single lens reflex camera of claim 1 wherein the film back attachment housing changes the focal length from about 43 mm to about 70 mm.
8. The single lens reflex camera of claim 1, further including a focusing dial disposed on the top of the camera.
9. The single lens reflex camera of claim 1, further including a focusing dial disposed around the lens.
10. The single lens reflex camera of claim 1, further including an automatic film winding device positioned in close proximity to the film winding lever so that it can be easily reached by the index finger of the operator without bending the finger.

11. A single lens reflex camera which can be modified to also function as a self-developing camera which comprises a main camera body, a lens system containing a reflecting mirror, a self-developing film attachment unit adapted to be connected to the back of the main camera body, said film attachment unit changing the film plane from that of a single lens reflex camera to that of a self-developing camera, and an adjustable view finder having a focusing screen, said view finder being adjustable to accommodate the film plane of both the single lens reflex camera and the self-developing camera so that the distance from the center of the mirror to the desired film plane is equal to the distance from the center of the mirror to the focusing screen.

12. The single lens reflex camera of claim 11 wherein the focal length of the view finder is adjusted about 20 mm to compensate for the self-developing film attachment unit.

* * * * *